United States Patent
Hsu et al.

(10) Patent No.: US 10,421,492 B2
(45) Date of Patent: Sep. 24, 2019

(54) ASSISTED STEERING SYSTEM WITH VIBRATIONAL FUNCTION FOR VEHICLES AND METHOD FOR CONTROLLING THE SAME

(71) Applicant: Automotive Research & Testing Center, Changhua Hsien (TW)

(72) Inventors: Jin-Yan Hsu, Changhua Hsien (TW); Tong-Kai Jhang, Changhua Hsien (TW); Chih-Jung Yeh, Changhua Hsien (TW)

(73) Assignee: Automotive Research & Testing Center, Changhua Hsien (TW)

(*) Notice: Subject to any disclaimer, the term of this patent is extended or adjusted under 35 U.S.C. 154(b) by 384 days.

(21) Appl. No.: 15/394,298

(22) Filed: Dec. 29, 2016

(65) Prior Publication Data

US 2018/0186400 A1 Jul. 5, 2018

(51) Int. Cl.
*B62D 15/02* (2006.01)

(52) U.S. Cl.
CPC .................. *B62D 15/029* (2013.01)

(58) Field of Classification Search
CPC ...... B62D 15/029; B62D 5/04; B62D 5/0472; B62D 6/06; B62D 7/22
See application file for complete search history.

(56) References Cited

U.S. PATENT DOCUMENTS

| | | | | |
|---|---|---|---|---|
| 5,656,901 A | * | 8/1997 | Kurita | A63F 13/06 318/114 |
| 8,626,394 B2 | * | 1/2014 | Kezobo | B62D 5/0472 180/443 |
| 10,000,235 B2 | * | 6/2018 | Toda | B62D 6/00 |
| 2008/0023258 A1 | * | 1/2008 | Inoue | B62D 5/008 180/444 |
| 2013/0161115 A1 | * | 6/2013 | Huang | B62D 5/008 180/444 |
| 2015/0109114 A1 | * | 4/2015 | Kariatsumari | B62D 15/029 340/425.5 |
| 2016/0031477 A1 | * | 2/2016 | Kimpara | B62D 5/0463 701/41 |

(Continued)

FOREIGN PATENT DOCUMENTS

TW    I432353 A1    2/2013

*Primary Examiner* — Joseph M Rocca
*Assistant Examiner* — Felicia L. Brittman
(74) *Attorney, Agent, or Firm* — C. G. Mersereau; DeWitt LLP

(57) ABSTRACT

An assisted steering system with vibrational function for vehicles is applied to a steering system of a vehicle. The steering system has a first steering column and a second steering column, and the assisted steering system includes a speed-adjustable steering device and an electronic control unit. The speed-adjustable steering device is connected between the first steering column and the second steering column and has a motor. The electronic control unit is electrically connected to the motor, generates a vibration driving current when receiving a warning command, combines a steering driving current with the vibration driving current to generate a motor control current, and outputs the motor control current to the motor of the speed-adjustable steering device to excite windings of the motor with the vibration driving current in generation of a vibrational effect.

10 Claims, 6 Drawing Sheets

(56) References Cited

U.S. PATENT DOCUMENTS

| | | | |
|---|---|---|---|
| 2016/0244089 A1* | 8/2016 | Scotson | H02P 29/0241 |
| 2016/0250968 A1* | 9/2016 | Shirakata | B60W 50/16 340/576 |
| 2016/0362102 A1* | 12/2016 | Honda | B60K 1/02 |
| 2017/0166247 A1* | 6/2017 | Gotou | B62D 5/0472 |
| 2017/0232889 A1* | 8/2017 | Miura | B60Q 9/00 340/441 |
| 2018/0015919 A1* | 1/2018 | Hanzawa | B60W 50/14 |

* cited by examiner

ASSISTED STEERING SYSTEM WITH VIBRATIONAL FUNCTION FOR VEHICLES AND METHOD FOR CONTROLLING THE SAME

BACKGROUND OF THE INVENTION

1. Field of the Invention

The present invention relates to an assisted steering system for vehicles and a method for controlling the same and, more particularly, to an assisted steering system with vibrational function for vehicles and a method for controlling the same.

2. Description of the Related Art

In view of escalating concern for driving safety, many techniques relevant to driving safety, such as advanced driver assistance system (ADAS), lane departure warning (LDW), lane keeping system (LKS), forward collision warning (FCW), blind-spot detection system (BDS) and the like, have been commercialized or are still under development in answer to the call.

Conventional warnings for irregular driving include alarm tone or warning light. As paying their attention to driving already, drivers may be able to detect their irregular driving behavior through the alarm tone or warning light in the first place. Besides, if there is any passenger in the car, such alarm tone or warning light will make the passenger nervous and uncomfortable.

To take avoidance of driver's distraction and passenger's comfort into account, a Taiwanese Patent Publication No. 1432353 entitled "Driving device featuring superimposed steering angle" is introduced to provide a driving device with a driving motor driven to rotate according to a driving current for steering for bringing forth improvement on steering control with vibrational warning.

SUMMARY OF THE INVENTION

An objective of the present invention is to provide an assisted steering system with vibrational function for vehicles and a method for controlling the assisted steering system, which provides a warning to the driver through vibration of the steering wheel when irregular driving behavior is detected.

To achieve the foregoing objective, the assisted steering system with vibrational function for vehicles is applied to a vehicular steering system having a first steering column and a second steering column, and the assisted steering system includes a speed-adjustable steering device and electronic control unit.

The speed-adjustable steering device is connected between the first steering column and the second steering column and has a motor mounted inside the speed-adjustable steering device.

The electronic control unit is electrically connected to the motor, generates a vibration driving current when receiving a warning command, combines a steering driving current with the vibration driving current to generate a motor control current, and outputs the motor control current to the motor of the speed-adjustable steering device.

To achieve the foregoing objective, the method for controlling an assisted steering system with vibrational function for vehicles includes steps of:
receiving a warning command;
generating a vibration driving current according to the warning command;
combining a steering driving current with the vibration driving current to generate a motor control current; and
outputting the motor control current to the motor of the speed-adjustable steering device.

According to the foregoing description, the motor of the speed-adjustable steering device can provide a speed-adjustable steering function and a vibrational function through control over the motor of the speed-adjustable steering device. The first steering column is connected between a steering wheel of the vehicle and the speed-adjustable steering device. When the motor receives the vibration driving current, the windings of the motor are excited by the vibration driving current to generate a vibrational effect. As the motor is mounted inside the speed-adjustable steering device, when the motor is vibrated, the first steering column and the steering wheel are also vibrated, such that the driver can sense the vibration indicative of a warning when holding the steering wheel.

Also because the motor is not directly mounted on the steering wheel, no additional vibration device needs to be mounted on the steering wheel. Additionally, the way of warning the driver on irregular driving behavior through vibration of the steering wheel will not disturb other passengers in the vehicle.

Other objectives, advantages and novel features of the invention will become more apparent from the following detailed description when taken in conjunction with the accompanying drawings.

DETAILED DESCRIPTION OF THE INVENTION

Figure 1:
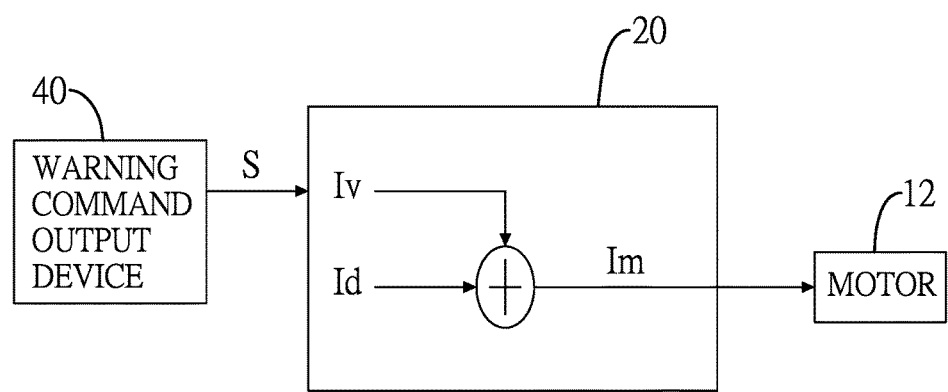
FIG. 1 is a functional circuit diagram of an electronic control unit of an assisted steering system with vibrational function in accordance with the present invention.
Figure 2:
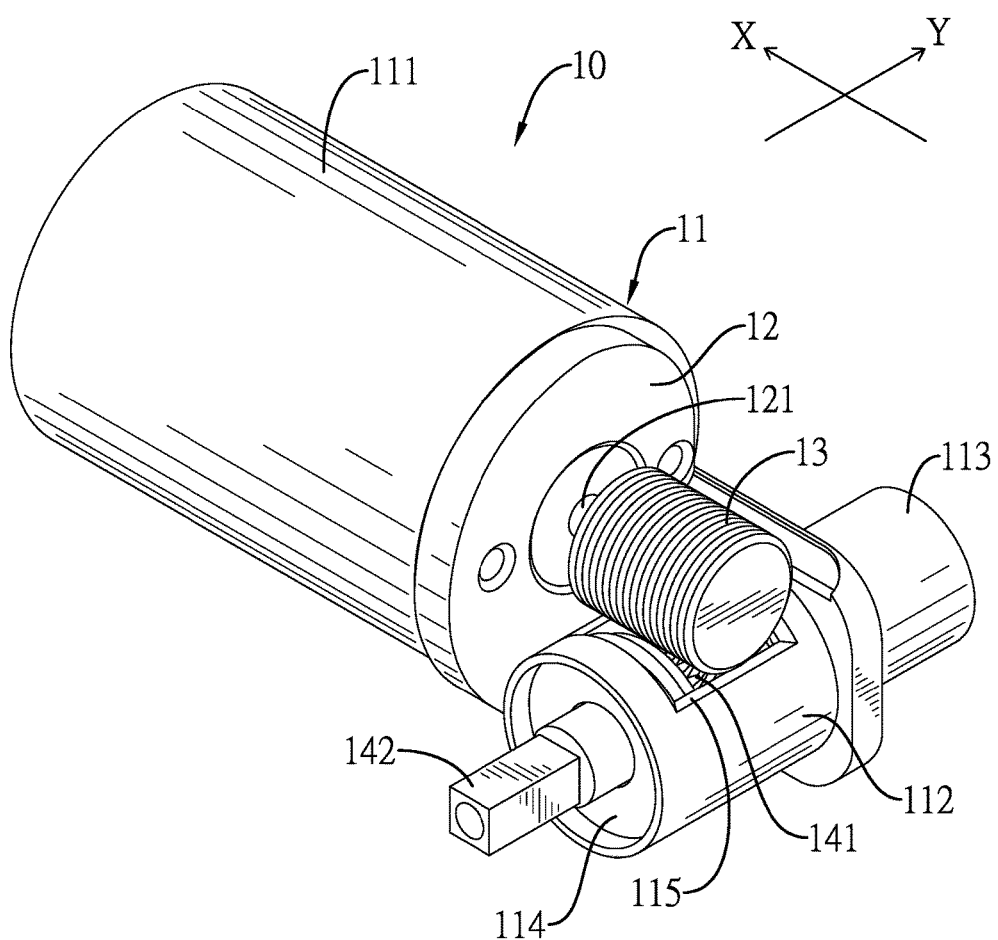
FIG. 2 is a perspective view of a speed-adjustable steering device of an assisted steering system in accordance with the present invention.

With reference to FIGS. 1 and 2, an assisted steering system with vibrational function in accordance with the present invention includes a speed-adjustable steering device 10 and an electronic control unit 20.

Figure 3:
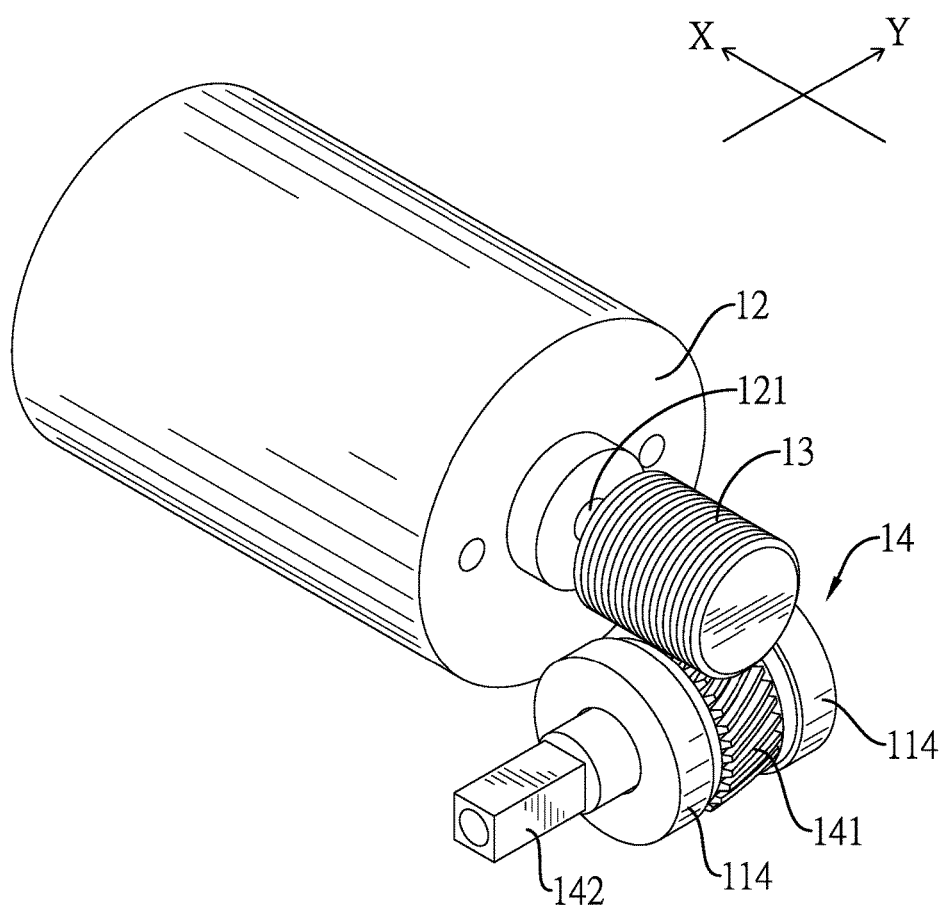
FIG. 3 is a perspective view showing combination and operation of a motor, a worm and a worm wheel of the speed-adjustable steering device in FIG. 2.
Figure 4:
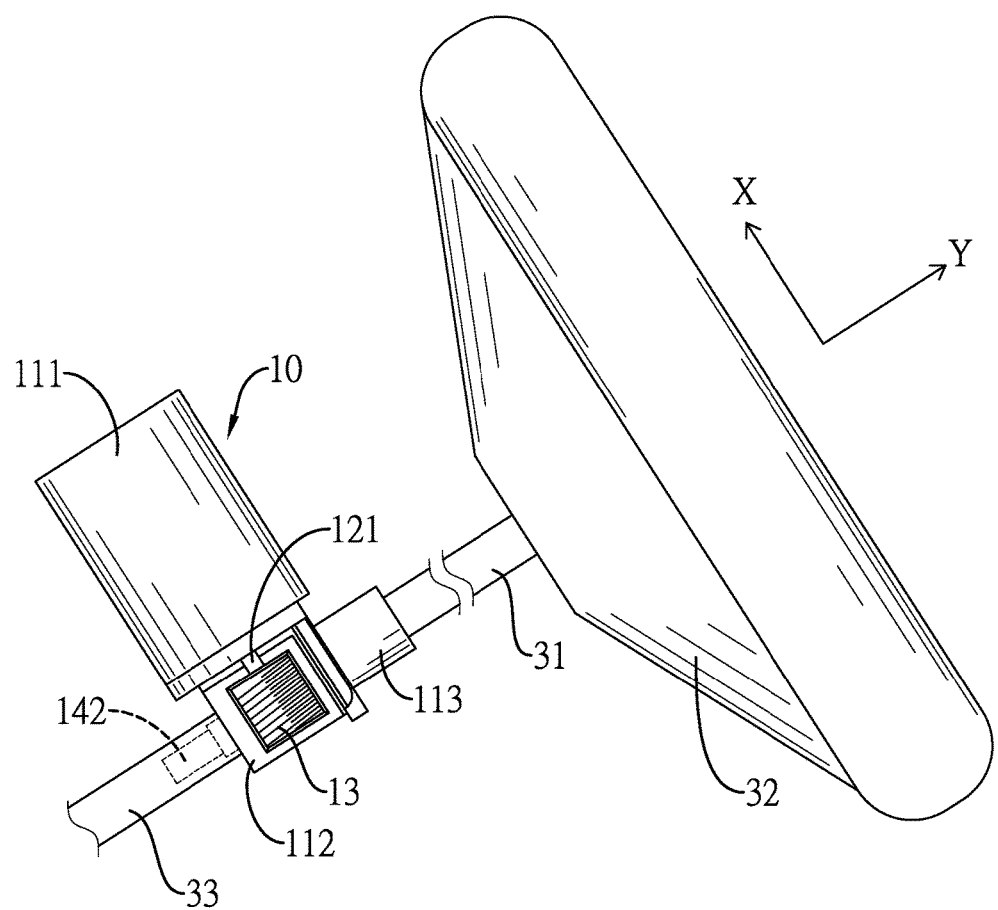
FIG. 4 is a top view of the speed-adjustable steering device in FIG. 2 applied to a vehicular steering system.

The speed-adjustable steering device 10 is applicable to a vehicular steering system. With reference to FIGS. 2 and 3, the speed-adjustable steering device 10 has a holding frame 11, a motor 12, a worm 13 and a worm wheel assembly 14. The holding frame 11 has a first accommodating member 111, a second accommodating member 112 and a connection seat 113. With reference to FIG. 4, the vehicular steering system includes a first steering column 31, a steering wheel 32 and a second steering column 33.

With reference to FIGS. 2 and 3, the first accommodating member 111 is hollow and is aligned in a first-axis direction of a first axis and is mounted on the second accommodating member 112, and the second accommodating member 112 is aligned in a second-axis direction and has a first end and a second end opposite to each other. The second accommodating member 112 is hollow and has a bearing 114 mounted inside the second accommodation part 112 with an axial direction aligned in the second-axis direction. The bearing 114 is rotatable together with the second accommodating member 112. The first-axis direction may be perpendicular to the second-axis direction. The first-axis direction may be a direction of the X axis, and the second-axis direction may be a direction of the Y axis. The connection seat 113 is securely mounted on the first end of the second accommodating member 112. The motor 12 is mounted inside the first accommodating member 111 and has a spindle 121 axially aligned in the first-axis direction. The worm 13 is securely connected with the spindle 121 of the motor 12, is located outside the second accommodating member 112, and is axially aligned in the first-axis direction. The worm wheel assembly 14 is mounted inside the second accommodating member 112, is pivotally mounted on the bearing 114 to rotate around an axial axis of the worm wheel assembly 14 aligned in the second-axis direction, relative to the bearing 114. The worm wheel assembly 14 has a wheel body 141 and a connection column 142. The worm body 141 engages the worm 13. In the present embodiment, the second accommodating member 112 has an opening 115 formed through a circumferential periphery of thereof. The wheel body 141 protrudes beyond the opening 115 to engage the worm 13. The connection column 142 is aligned in the second-axis direction, is securely connected with the worm body 141, and protrudes beyond the second end of the second accommodating member 112. The connection column 142 may have a non-circular cross-section, such as a polygonal cross-section. In the present embodiment, the cross-section of the connection column 142 is of including but not limited to a square shape.

With reference to FIG. 4, the speed-adjustable steering device 10 is connected between the first steering column 31 and the second steering column 33. The connection seat 113 is securely connected with one end of the first steering column 31. The other end of the first steering column 31 is connected with the steering wheel 32. The connection column 142 of the worm wheel assembly 14 is securely connected with one end of the second steering column 33. The other end of the second steering column 33 is connected with a steering rack to turn the wheels of the vehicle.

According the foregoing structure, when the driver turns the steering wheel 32, the steering wheel 32 is rotated to drive the first steering column 31 to rotate, and the first steering column 31 further drive the connection seat 113 and the holding frame 11 to rotate around the second-axis direction, such that the motor 12 inside the holding frame 11 is also wholly rotated around the second-axis direction. When the motor 12 is turned off, the worm 13 connected with the spindle 121 of the motor remains motionless. However, because the worm 13 engages the wheel body 141, when the worm 13 is rotated along with the holder frame 11 around the second-axis direction, the wheel body 141 engaging the worm 13 is driven to rotate around the second-axis direction, the second steering column 33 is driven by the connection column 142 to rotate around the second-axis direction, and the second steering column 33 and the first steering column 31 are rotated at a same rotation speed.

When the motor 12 is turned on and the spindle 121 is rotated, the worm 13 is rotated around the first-axis direction to drive the wheel body 141 to rotate around the second-axis direction. At the moment, a rotation angle of the second steering column 33 is equal to a sum of a rotation angle of the first steering column 31 and a rotation angle of the wheel body 141 driven by the worm 13 when the motor 12 is turned on. By virtue of the control over operation of the motor 12, under the circumstance of the first steering column 31 driven only by the steering wheel 32 at a same rotation speed, the second steering column 33 can be rotated at a low speed or a high speed in response to a high or low vehicle speed.

Figure 5:
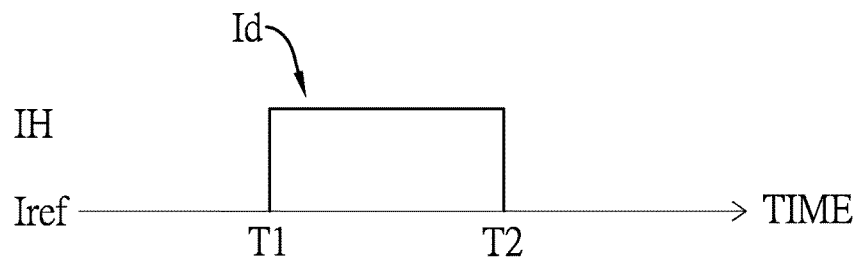
FIG. 5 is a waveform diagram of a steering driving current applied to an assisted steering system in accordance with the present invention.
Figure 6:
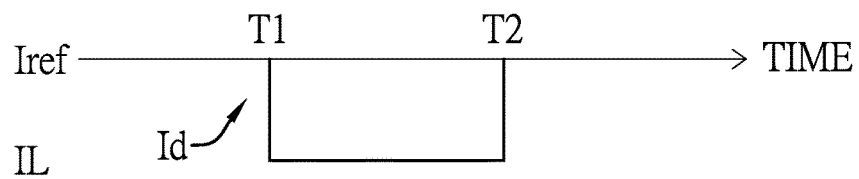
FIG. 6 is another waveform diagram of a steering driving current applied to an assisted steering system in accordance with the present invention.

With reference to FIG. 1, the electronic control unit 20 may be mounted as part of electronic circuits of the vehicle, and is electrically connected to the motor 12 and a warning command output device 40. The electronic control unit 20 generates a steering driving current Is for starting the motor 12 to operate. Generation of the steering driving current is a well-known technique, which can be referred to the Taiwanese Patent I432353 and is thus not repeated here. With reference to FIG. 5, a waveform of the steering driving current is shown. To facilitate explanation, the steering driving current Is may be a pulse signal last between a starting time T1 and an ending time T2 during the turning of the steering wheel 32. A high current level IH relative to a reference current level Iref indicates that the steering wheel 32 and the wheels of the vehicle are rotated clockwise. On the contrary, with reference to FIG. 6, a low current level IL relative to a reference current level Iref indicates that the steering wheel 32 and the wheels of the vehicle are rotated counterclockwise. The reference current level Iref may include, but is not limited to 0 amp.

The warning command output device 40 serves to generate a warning command S. In the present embodiment, the warning command output device 40 includes but is not limited to an ADAS. The ADAS is a well-known technique. Therefore, techniques like LDS, LDS, FCW and BDS of the ADAS are not elaborated here. The ADAS can automatically detect irregular driving and automatically generates the warning command S.

Figure 7:
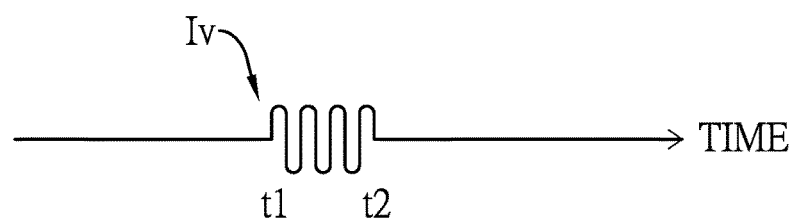
FIG. 7 is a waveform diagram of a vibrational driving current applied to an assisted steering system in accordance with the present invention.

When receiving the warning command S, the electronic control unit 20 generates a corresponding vibration driving current Iv. The amplitude of the vibration driving current is less than that of the steering driving current Is (i.e. a variation between the high current level IK and the reference current level Iref or a variation between the reference current level Iref and the low current level IL), and the frequency of the vibration driving current Iv is greater than that of the steering driving current Is. A DC (Direct Current) current level of the vibration driving current Iv may be the high current level IH or the low current level IL of the steering driving current Id. With reference to FIG. 7, a waveform of the vibration driving current Iv is shown. The vibration driving current Iv is exemplified by but is not limited to a sinusoidal waveform. The vibration driving current may take a square waveform, a triangular waveform or the like. The electronic control unit 20 generates a motor control current Im according to the steering driving current Id and the vibration driving current Iv. The waveform of the motor control current Im can be referred to FIG. 8. The electronic control unit 20 outputs the motor control current Im to the motor 12 for the motor 12 to operate according to the motor control current Im.

Figure 8:
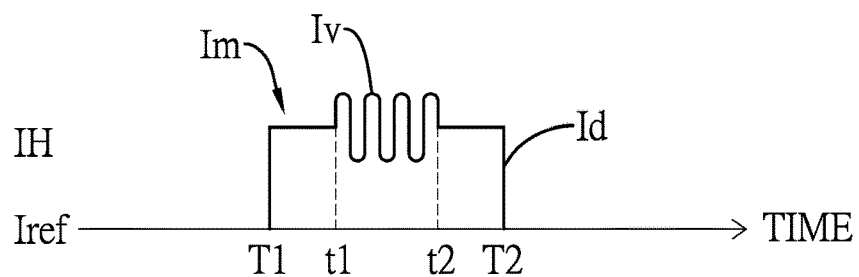
FIG. 8 is a waveform diagram of a motor control current applied to an assisted steering system in accordance with the present invention.

With reference to FIGS. 5, 7 and 8, when receiving the warning command S, the electronic control unit 20 generates the vibration driving current Iv corresponding to the warning command S, and a time period for the electronic control unit 20 to generate the vibration driving current Iv is a default value configured in the electronic control unit 20. With further reference to FIG. 7, the electronic control unit 20 receives the warning command S at a first time spot t1 and continuously generates the vibration driving current Iv between the first time spot t1 and a second time spot t2. Thus, the electronic control unit 20 can combine the vibration driving current Iv and the steering driving current Id to form the motor control current Im. With further reference to FIG. 8, it is noted that the first time spot t1 is later than the starting time T1 during the turning of the steering wheel 32, and the second time spot t2 is earlier than the ending time T2 during the turning of the steering wheel 32, such that the first time spot t1 and the second time spot t2 are included in the time duration between the starting time T1 and the ending time T2 during the turning of the steering wheel 32. Accordingly, besides the current component of the steering driving current Id, the motor control current Im further includes the current component of the vibration driving current Iv between the first time spot t1 and the second time spot t2.

Hence, when receiving the motor control current Im, not only the motor 12 of the speed-adjustable steering device 10 does operate according to the current component of the steering driving current Is, but also the current component of the vibration driving current excites windings of the motor 12 for the motor 12 to generate a vibration effect. For example, a vibration frequency of the motor 12 is equivalent to a sinusoidal frequency of the vibration driving current Iv.

When the steering driving current Is generated by the electronic control unit 20 is zero, the motor control current Im just has the current component of the vibration driving current Iv. Meanwhile, although not operated, the windings of the motor 12 can still be excited by the current component of the vibration driving current Iv to generate the vibrational effect.

Figure 9:
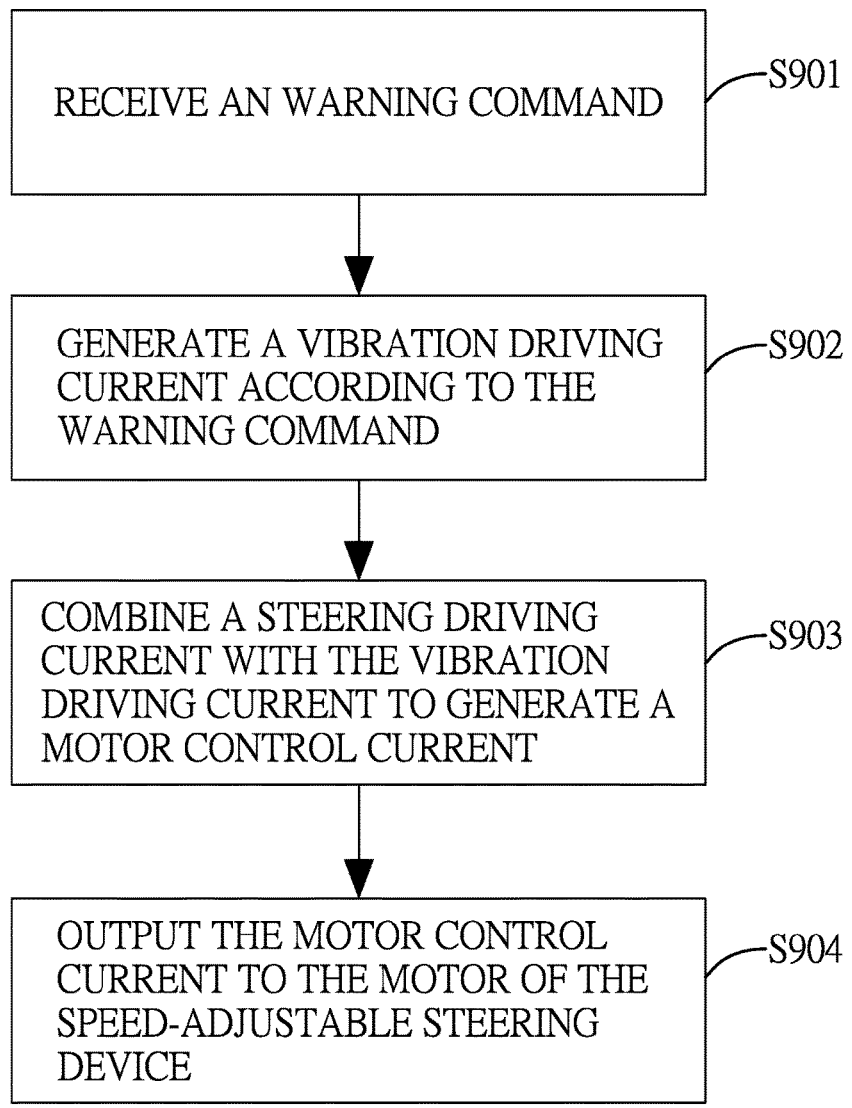
FIG. 9 is a method for controlling an assisted steering system with vibrational function for vehicles in accordance with the present invention.

With reference to FIG. 9, a method for controlling the foregoing assisted steering system with vibrational function for vehicles in accordance with the present invention is performed by the electronic control unit of the assisted steering system and includes the following steps.

Step S901: Receive a warning command.

Step S902: Generate a vibration driving current according to the warning command.

Step S903: Combine a steering driving current with the vibration driving current to generate a motor control current.

Step S904: Output the motor control current to the motor of the speed-adjustable steering device.

In sum, because the motor 12 is securely mounted inside the holding frame 11 of the speed-adjustable steering device 10 and the speed-adjustable steering device 10 is combined with the vehicular steering system, the speed-adjustable steering device 10 can be indirectly connected with the steering wheel 32 through the first steering column 31. When the motor 12 of the speed-adjustable steering device 10 generates a vibrational effect, the steering wheel 32 is vibrated as well for the driver who is holding the steering wheel to be aware of a warning condition through vibration of the steering wheel 32 and quickly correct an irregular driving behavior for the driving safety.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An assisted steering system with vibrational function for vehicles applied to a vehicular steering system having a first steering column and a second steering column, the assisted steering system comprising:
   a speed-adjustable steering device connected between the first steering column and the second steering column and having a motor mounted inside the speed-adjustable steering device; and
   an electronic control unit electrically connected to the motor, generating a vibration driving current when receiving a warning command, combining a steering driving current with the vibration driving current to generate a motor control current, and outputting the motor control current to the motor of the speed-adjustable steering device, wherein a time period for the electronic control unit to generate the vibration driving current is a default value configured in the electronic control unit.

2. The assisted steering system as claimed in claim 1, wherein an amplitude of the vibration driving current is less than that of the steering driving current, and a frequency of the vibration driving current is greater than that of the steering driving current.

3. The assisted steering system as claimed in claim 2, wherein a DC current level of the vibration driving current is a high current level or a low current level of the steering driving current.

4. The assisted steering system as claimed in claim 3, wherein the vibration driving current is a sinusoidal current.

5. The assisted steering system as claimed in claim 1, wherein a DC (Direct Current) current level of the vibration driving current is a high current level or a low current level of the steering driving current.

6. The assisted steering system as claimed in claim 5, wherein the vibration driving current is a sinusoidal current.

7. The assisted steering system as claimed in claim 1, wherein the electronic control unit is electrically connected to an advanced driver assistance system (ADAS) to receive the warning command from the ADAS.

8. The assisted steering system as claimed in claim 1, wherein the speed-adjustable steering device has:
   a holding frame having a connection seat securely connected with the first steering column;
   the motor securely mounted inside the holding frame and having a spindle axially aligned in a first-axis direction;
   a worm securely connected with the spindle of the motor and axially aligned in the first-axis direction; and
   a worm wheel assembly pivotally mounted on a bearing inside the holding frame and having:
      a wheel body engaging the worm; and
      a connection column aligned in a second-axis direction and securely connected with the worm body and the second steering column.

9. A method for controlling an assisted steering system with vibrational function for vehicles performed by an electronic control unit of an assisted steering system with vibrational function for vehicles, wherein the electronic control unit is electrically connected to a motor of a speed-adjustable steering device and the speed-adjustable steering device is connected between a first steering column and a second steering column of a steering system of a vehicle, the method comprising steps of:
- receiving a warning command;
- generating a vibration driving current according to the warning command, wherein a time period for the electronic control unit to generate the vibration driving current is a default value configured in the electronic control unit;
- combining a steering driving current with the vibration driving current to generate a motor control current; and
- outputting the motor control current to the motor of the speed-adjustable steering device.

10. The method as claimed in claim 9, wherein an amplitude of the vibration driving current is less than that of the steering driving current, a frequency of the vibration driving current is greater than that of the steering driving current, and a DC (Direct Current) current level of the vibration driving current is a high current level or a low current level of the steering driving current.

* * * * *